A. E. GREENE.
AUTOMATIC CIRCUIT BREAKER.
APPLICATION FILED JUNE 12, 1905.
986,708.
Patented Mar. 14, 1911.
3 SHEETS—SHEET 1.
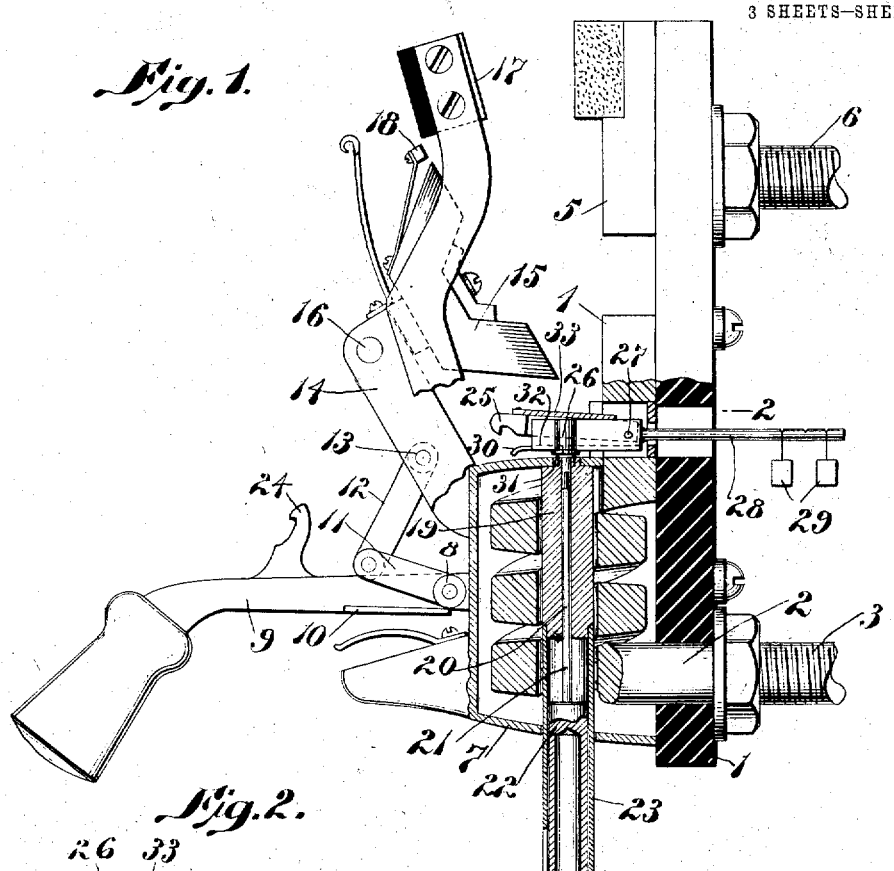
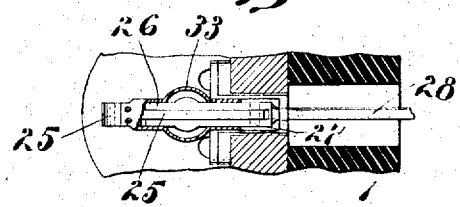
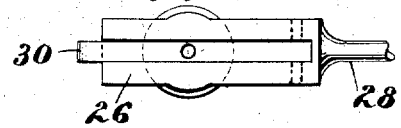
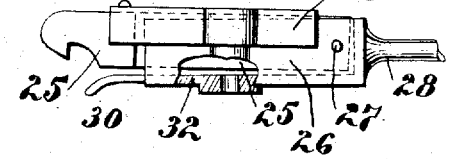
Witnesses:
Walter H. Naylor
M. A. Jones
Inventor:
Austin E. Greene,
by Geo. H. Maxwell
Attorney.

A. E. GREENE.
AUTOMATIC CIRCUIT BREAKER.
APPLICATION FILED JUNE 12, 1905.
986,708.
Patented Mar. 14, 1911.
3 SHEETS—SHEET 2.
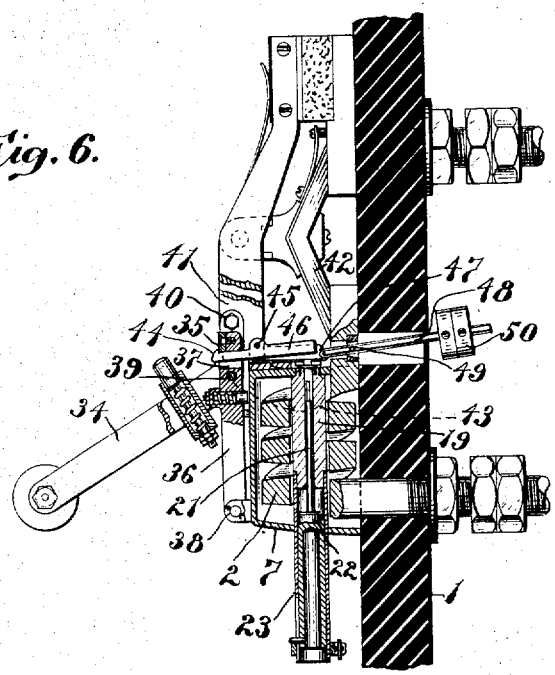
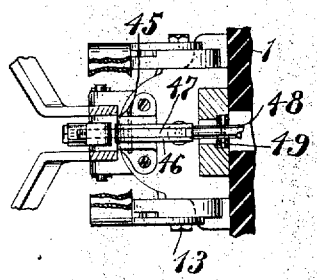
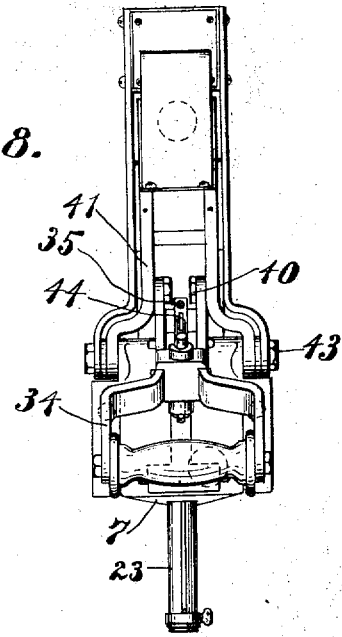
Witnesses:
Walter H. Naylor.
M. A. Jones.
Inventor:
Austin E. Greene,
by Geo. H. Maxwell
Attorney.

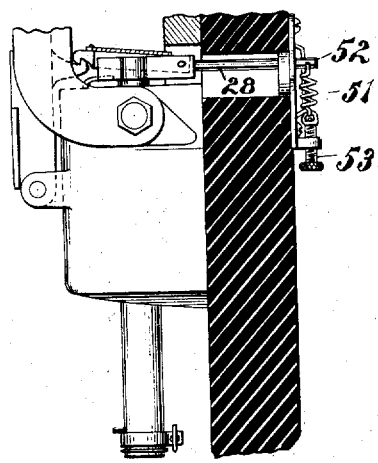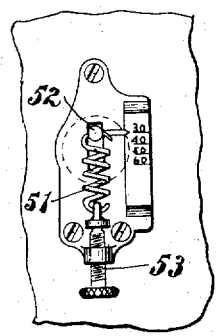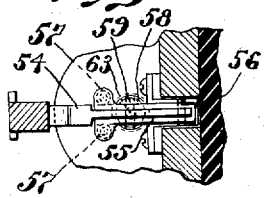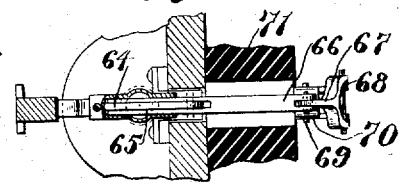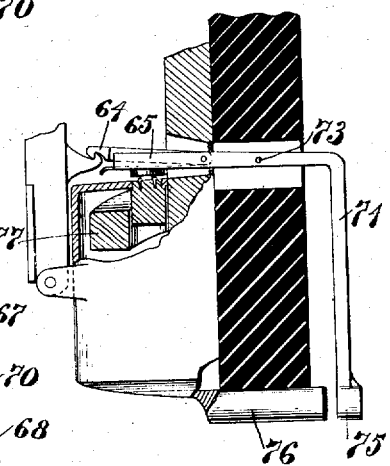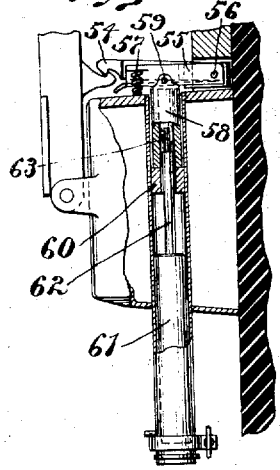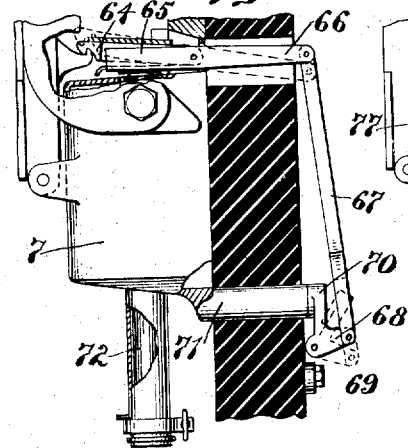

UNITED STATES PATENT OFFICE.

AUSTIN E. GREENE, OF SOUTH BOSTON, MASSACHUSETTS, ASSIGNOR TO SEARS B. CONDIT, JR., OF BOSTON, MASSACHUSETTS.

AUTOMATIC CIRCUIT-BREAKER.

986,708.  Specification of Letters Patent. Patented Mar. 14, 1911.

Application filed June 12, 1905. Serial No. 264,872.

*To all whom it may concern:*

Be it known that I, AUSTIN E. GREENE, a citizen of the United States, residing at South Boston, in the county of Suffolk and State of Massachusetts, have invented an Improvement in Automatic Circuit-Breakers, of which the following description, in connection with the accompanying drawings, is a specification, like letters on the drawings representing like parts.

My invention is a circuit breaker provided with a single magnetic control responsive to an overload, and underload for automatically releasing and tripping the circuit breaker.

In connection with motor generators, battery charging equipments, and with generators which are liable to be reversed, it is desirable to have a circuit breaker responsive either to an excessive amount of current or to a reduced amount of current. It is also desirable to have a circuit breaker which is responsive to an excess of current and which will open also when the voltage falls to a certain point or reaches zero, as, for instance, as a safety device for distant, unattended apparatus, or in connection with batteries which are left to discharge without attendance and which are to be automatically cut out when the battery potential approximates the charging voltage.

As herein shown, I have accomplished the desired result by providing a series coil and trip in connection with an easily tripped, free-acting circuit breaker, said coil having a double core, one part of said core being magnetized to retain the latch in locking position against the action of a counterbalancing force, so that, upon the occurrence of an underload, the trip is automatically released by the action of said counterbalancing force, the other part of said core being energized to overcome the restraining influence of the first-mentioned part of said core upon the occurrence of an overload.

In the accompanying drawings I have shown several embodiments of my invention, each of which has advantages over the others for particular locations and conditions.

Figure 1 shows one embodiment of my invention, partly in section and largely in side elevation; Fig. 2 is a fragmentary cross-sectional detail thereof taken approximately on the line 2, Fig. 1; Fig. 3 is an enlarged cross section of the armature and latch; Fig. 4 is a top plan view of armature with the latch removed; Fig. 5 is an enlarged side elevation, partly broken away, showing the armature and latch; Fig. 6 is a view similar to Fig. 1 showing, however, another application of my invention; Fig. 7 is a fragmentary view partly in section looking down upon the latch and coil; Fig. 8 is a front view of the mechanism shown in Fig. 6 looking toward the right; Fig. 9 is a vertical sectional view, and Fig. 10 a rear elevation of a still further embodiment of my invention; Figs. 11 and 12 are fragmentary views, in top plan and broken side elevation respectively, of a floating armature embodiment of the invention; Figs. 13 and 14 are similar views of a magnetically actuated counterbalance device providing for overload and underload; and Fig. 15 is a fragmentary view, in side elevation, and partly in section, of a still further magnetic counterbalance movement.

Taking the different constructions individually, it will be seen that in Fig. 1 I have mounted on a suitable base 1 a usual heavy coil 2 secured by a binding post 3 and connected at its upper end to one terminal or contact block 4, the other block 5 connecting to a binding post 6. Said coil 2 is housed in a shell 7, to which is pivoted at 8 an operating handle 9 whose lifting ledges or flanges 10 are in position to engage the lower link 11 of a toggle, the upper link 12 of which is pivoted at 13 to the arms 14 which carry at their upper ends a laminated contact brush 15 pivoted therein at 16 and provided with a shunt contact 17 and auxiliary contact 18.

In the coil 2 is mounted a relatively short underload core or core-part 19, shown as screwed into the shell 7 at its upper end and provided with a central bore 20 to receive a rod-like plunger or stem 21 operated by a lower overload core or core-part 22 sliding in a core shell 23 secured for convenience to the lower end of the part 19. The operating handle 9 is provided with a usual catch 24 engaged by a non-magnetic latch 25.

The latch 25 is carried by an armature 26 pivoted at 27 above the coil 2 and provided with a rearward end 28 weighted or otherwise counterbalanced, being shown in Fig. 1 as provided with weights 29. The latch 25 is freely movable with relation to the armature, being herein shown as mounted on the pivot 27 and is shown in Fig. 1 in the position normally occupied when engaged by the catch 24. The armature is provided with a lip or cam surface 30 in position to be engaged by the under side of the catch 24 when the latter is swung into closed position, whereby the armature is automatically forced down against the end of the magnet core 19. The latter is provided with brass pins 31 projecting slightly above the top surface so as to maintain an air gap and prevent the armature 26 from clinging or being retained by the residual magnetism of the core.

Viewing Fig. 2, it will be seen that the latch 25 is narrow at its rear portion and rests in a groove formed between the opposite sides of the armature 26 and above the closed bottom 32 thereof, indicated by dotted lines in Fig. 1, so as to be freely movable vertically therein. To insure free movement at all times, dust and the like are excluded by a hood or cap 33 preferably movable with the latch and inclosing both latch and armature. The engaging end of the latch 25 is mounted at such a height that when the catch 24 engages therewith, said latch will always be raised an appreciable distance above the bottom of the armature, as indicated in Fig. 1, where the dotted lower edge is shown in its normally engaged position with relation to the bottom 32 of the armature. The purpose of this provision is to insure a positive, hammer-like blow from the armature when the latter is released by a decrease of strength in the magnetic field (upon the occurrence of an underload condition).

In operation, when the circuit breaker is closed, the lip or cam surface 30 of the armature operates to force the armature down properly within the magnetic field where it is retained by the magnetized core 19 as long as normal current is flowing. If, however, the current drops below normal, it is obvious that the armature will immediately rise because of the counterbalance weights 29 and will give the latch 25 a sufficient blow to release the circuit breaker. If, on the other hand, an over load should occur, the core 22 will be quickly raised in the coil 2 thereby causing its stem 21 forcibly to engage the latch 25 and release the circuit breaker as before.

In Figs. 6–8 I have shown a different embodiment for providing a stronger movement and construction. The operating handle 34 in this case does not carry the catch, but a catch 35 is provided on a link or lever 36 (apertured at 37 to receive the latch of the circuit breaker), said link being pivoted at 38 to the shell 7 of the circuit breaker and at 39 to said operating handle 34, which is itself pivoted at its inner end at 40 to the arms 41 which carry the laminated brush 42 of the circuit breaker, said arms being pivoted at 43 at their lower ends, as clearly shown in Figs. 7 and 8. A latch 44 is pivoted at 45 to the upper end of the shell 7 and provided with a rearward extension 46 resting in the grooved armature 47 which is likewise pivoted at 45 and is also pivotally connected to a rearwardly extending counterbalance arm 48 pivoted at 49 and provided with counterbalancing weights 50.

From the foregoing description it will be evident that when the magnetism of the core 19 decreases below normal, the armature 47 will be thereby released and will be forcibly raised into striking engagement against the end 49 of the latch so as to lower its engaging end 44 away from the catch 35 and permit the circuit breaker to fly open; and likewise when an overload takes place the plunger 21 of the lower core similarly strikes the latch for releasing the circuit breaker as before.

In Figs. 9 and 10 I have shown a construction similar to that shown in Fig. 1, excepting that instead of having counterbalancing weights I have provided a delicately adjustable spring counterbalance, shown as comprising a spring 51 secured to the outer end 52 of the arm 28 and adjusted by means of a swiveled thumb-screw 53.

In Figs. 11 and 12 I have shown a latch 54 pivotally mounted in an armature 55 pivoted at 56 and provided at its forward end and outer sides with opposite counterbalancing springs 57 operating in opposition to a movable or floating underload armature 58 pivoted to the main armature at 59 and normally attracted by a stationary iron core 60 against the influence of said springs 57. A movable core 61 and its stem or plunger 62 coöperate with the above parts, said underload armature 58 being provided with an auxiliary opening 63 to permit the plunger 62 to rise and strike against the latch 54 upon the occurrence of an overload.

In Figs. 13 and 14 I have shown a form of magnetic release, comprising a latch 64 and armature 65 the same as before, said armature having a tail piece or counterbalancing arm 66 extending rearwardly and connected by a link 67 to a bell crank 68 pivotally mounted at 69 and provided at its free end with an enlarged armature portion 70 adjacent a magnetic extension 71 from the shell 7 (which in this case is composed of suitable magnetizable material such as soft iron). In this case, upon the occurrence of an underload the bell crank armature 70 will be permitted to fall away, thereby forcibly raising the main armature 65 into striking contact with the latch 64. For overload, this construction is provided with a movable core 72 the same as in Fig. 1.

In Fig. 15 I have shown a still further modification in which the latch and its armature are the same as in Fig. 14, but said armature is pivoted at 73 and has a counterbalancing arm 74 extending rearwardly and downwardly and terminating in an armature-portion 75 opposite an extension 76 similar in construction and operation to the extension 71 already described. A short, fixed core 77 is provided to coöperate with the armature 65, being of such proportions that it will maintain said armature in engagement therewith when normal current is flowing. When a decrease of current occurs, the magnetism in the core 77 will be insufficient to hold the armature 65 which will then be raised by the counterbalancing weight 74, 75 to release the latch 64. Likewise upon the occurrence of an overload the extension 76 will be magnetized sufficiently to draw the armature portion 75 of the counterbalancing device forcibly forward and release the latch 64.

It will be understood that my invention is capable of a wide variety of embodiments, some of the principal ones only having been described. In each case it will be seen that when the main armature has been released it is permitted to give a slight releasing blow to the latch. Also the pivotal arrangement of the latch allows the latter to separate from the armature to admit the catch without tending to remove the armature from its engagement with the magnet.

My principal aim has been to devise a construction whereby overload or underload conditions will be provided for by one operating means such as a single solenoid or coil. Another aim has been to provide a delicate and sensitive construction, certain and efficient under all circumstances. Either the mechanical or magnetic counterbalancing and tripping means may be employed, according to the convenience of the situation and the preference of the user.

It will be understood that I am not limited to any particular kind of circuit breaker or switch, as my invention may be readily modified to suit the requirements of any of the usual kinds of automatic circuit breakers. Also I wish it understood that I contemplate employing various of the individual features in sub-combinations and in other connections, and, with that end in view, have claimed them as such hereinafter.

Having described my invention, what I claim as new and desire to secure by Letters Patent, is:

1. In an automatic circuit breaker, a single tripping coil, two separate cores for said coil, one being movable and the other stationary and one being an underload core and the other an overload core, a single armature besides said two cores movable toward and away from said cores and actuated by said cores respectively in opposite directions, an operating handle provided with a catch and a separate releasing latch to engage said catch operated by said single armature to release said catch for opening the circuit breaker.

2. In an automatic circuit breaker, an operating handle provided with a catch, a latch to engage said catch for holding the circuit breaker closed, an electro-magnetic controlling device, and a tripping armature controlled thereby separate and distinct from said latch, having at its front end a projecting bottom portion in the path of said handle-catch, the latter passing between said latch and bottom portion upon the closing movement of the circuit breaker, for forcing said armature into operative position.

3. In an automatic circuit breaker, an operating handle provided with a catch, an electro-magnetic controlling device, a tripping armature therefor, and a latch operated by said armature and movable relatively thereto, said armature and latch receiving between them, and being separated by, said catch for retaining the circuit breaker closed.

4. In an automatic circuit breaker, an electro-magnetic controlling device, a tripping armature therefor, a latch carried and operated by said armature and movable relatively thereto for locking the circuit breaker closed, and means constituting a part of the armature operated by the closing of the circuit breaker for forcing said armature into operative position.

5. In an automatic circuit breaker, a locking catch for holding the circuit breaker closed, an electro-magnetic controlling device, a pivoted tripping armature therefor, a latch pivoted at its rear end on the armature in position to engage at its forward end the circuit breaker catch, said armature having at its forward end a projecting cam-shaped lip in line with said latch and normally separated from the latter a less distance than the width of said catch, whereby the armature and latch are forcibly separated by the entrance between them of said catch.

6. In an automatic circuit breaker, a locking catch for holding the circuit breaker closed, an electro-magnetic controlling device, a pivoted tripping armature therefor, a latch pivoted at its rear end on the armature in position to engage at its forward end the circuit breaker catch, said armature having at its forward end a projecting cam-shaped lip in line with said latch and normally separated from the latter a less distance than the width of said catch, an extension projecting rearwardly from said armature, and adjustable counterbalancing means therefor.

7. In an automatic circuit breaker, a single coil, a shell inclosing the same, a stationary core fastened in said shell to the upper end thereof, an armature mounted close to the upper end of said core, a latch pivoted on said armature, a catch for engaging said latch to retain the circuit breaker in closed position, and means on said armature coöperating with said catch for crowding the armature close to said core when the circuit breaker is closed.

In testimony whereof, I have signed my name to this specification, in the presence of two subscribing witnesses.

AUSTIN E. GREENE.

Witnesses:
 GEO. H. MAXWELL,
 M. A. JONES.